Jan. 22, 1963   J. A. Q. TARAZONA   3,074,468
DEVICE FOR MOUNTING AND DISMOUNTING PNEUMATIC TIRES
Filed Sept. 30, 1959   5 Sheets-Sheet 1
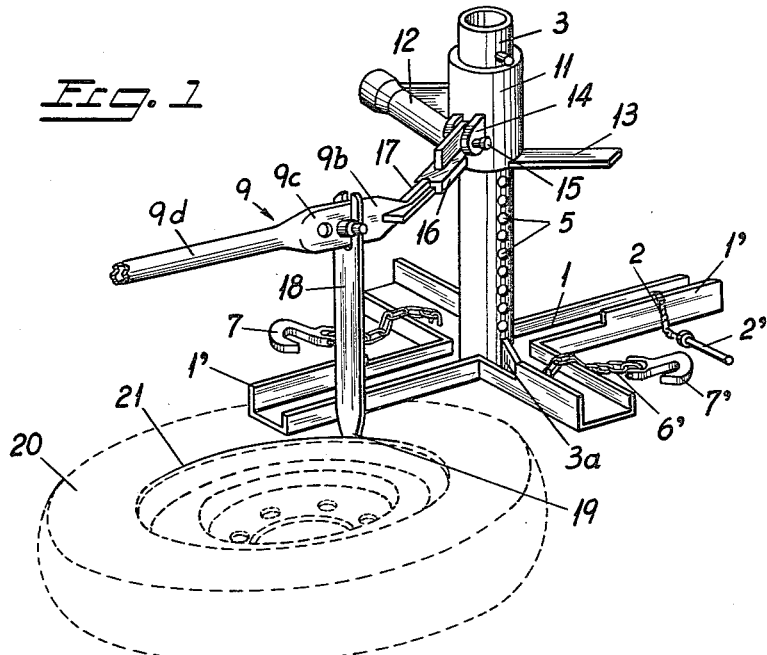
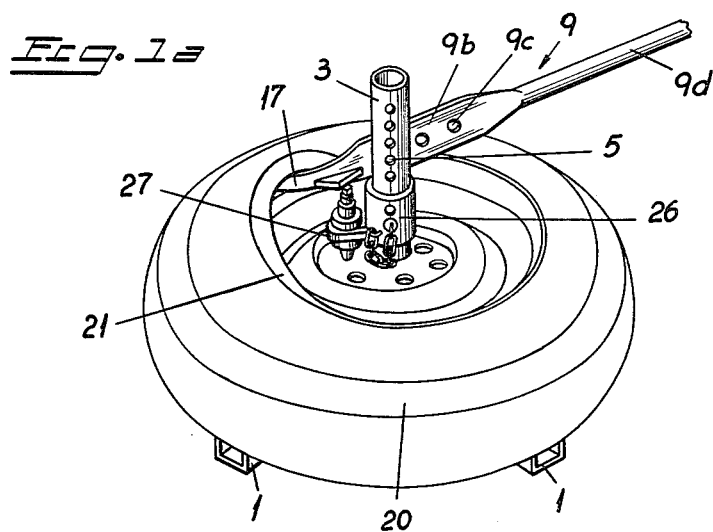
INVENTOR.
Jose Antonio Quintero
BY   Tarazona
Michael S. Striker
ATT'y

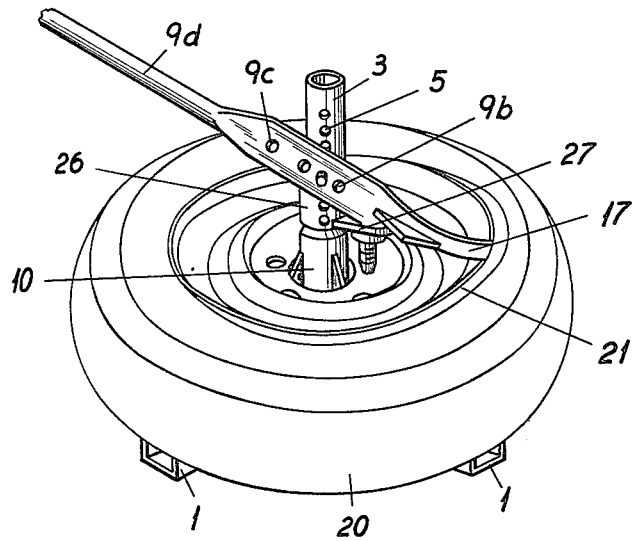
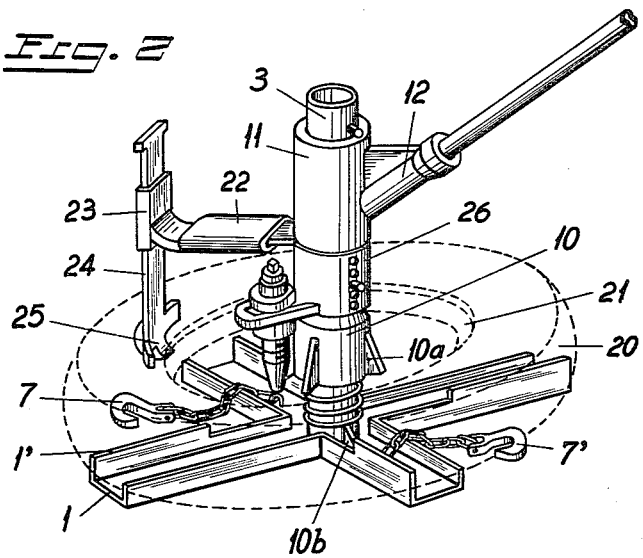

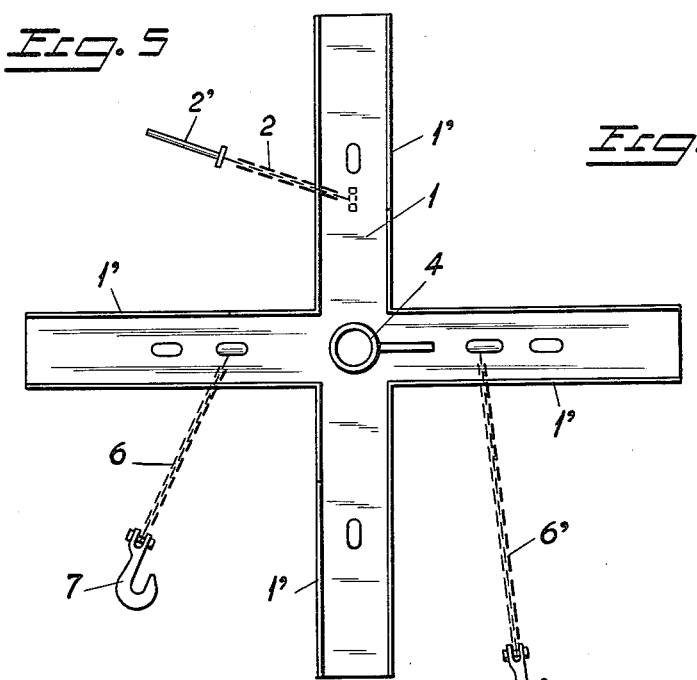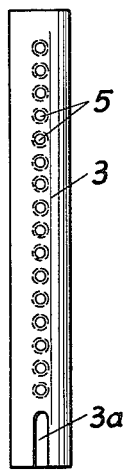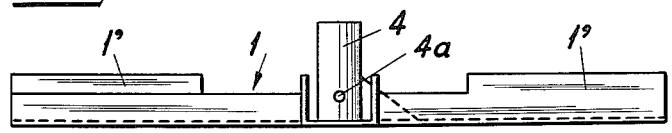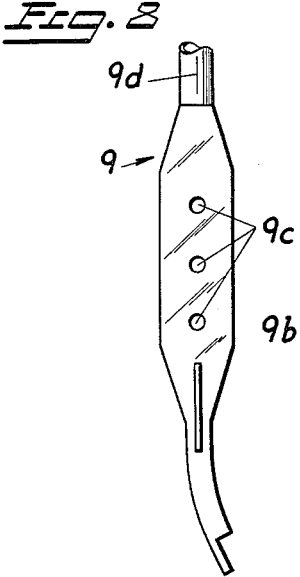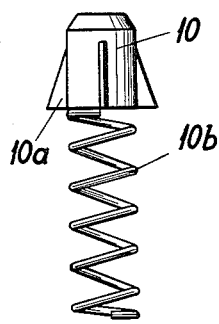

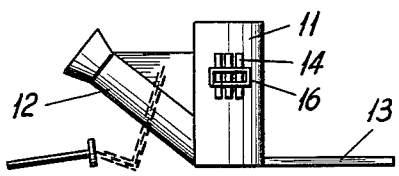
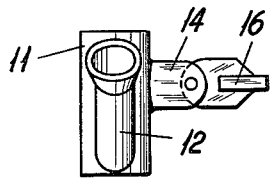
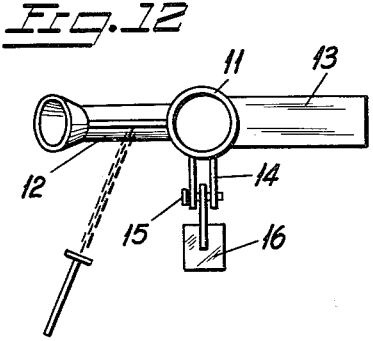
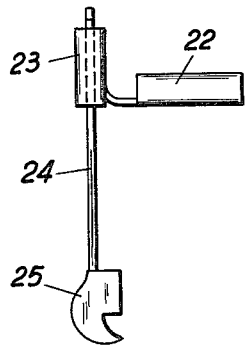
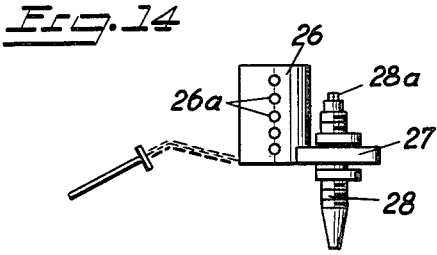
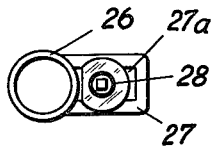
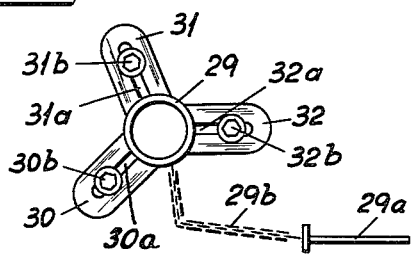
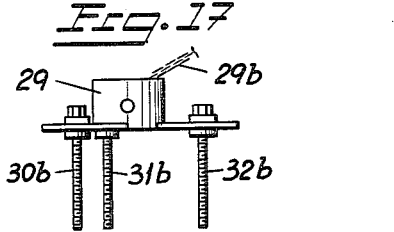
INVENTOR.
Jose Antonio Quintero
  Tarazona
BY
Michael J. Striker
  Attorney though still resting upon the latter. The device is placed with the hooks 7, 7' fastened by means of the chains 6, 6' to the rim of the wheel, after having removed the centering sleeve 10 and after having introduced the lever 9, the latter being pivotally mounted upon the stem 3 by means of the bolt 2. Upon swinging the handle bar 9d of the lever 9, tool 18 will exert a pressure upon the bead 19 of the tire, introducing the same into the hollow 21 of the rim.

United States Patent Office 3,074,468
Patented Jan. 22, 1963

3,074,468
DEVICE FOR MOUNTING AND DISMOUNTING PNEUMATIC TIRES
Jose Antonio Quintero Tarazona, 17 Calle Real de La Vega, Caracas, Venezuela
Filed Sept. 30, 1959, Ser. No. 843,424
2 Claims. (Cl. 157—1.24)

The object of the present invention is to provide a novel device for mounting and dismounting pneumatic tires of all kinds on wheels of automotive vehicles having rims arranged to carry pneumatic tires. Particularly the device according to the invention is intended for use in combination with modern type wheels, i.e. wheels wherein the rim is made in one piece formed by one integral body devoid of lateral rings for keeping the tires in place.

The device in accordance with the present invention is a useful auxiliary means for mechanical workshops, tire repair shops and garages, enabling to carry out the cumbersome task of placing the pneumatic tires onto the rims of wheels or of taking such tires off such rims with the utmost ease of operation, the device including a plurality of accessory elements adequate for effecting the operations involving the mounting and dismounting of the pneumatic tires.

In order that the present invention may be clearly understood and readily carried into practice, the same is depicted by way of a merely illustrative and by no means limiting example in the annexed drawings wherein:

FIGURE 1 is a perspective view showing the device adapted for taking a pneumatic tire off a wheel rim of an automobile or motor truck;

FIGURES 1a and 1b show each a perspective view of the device arranged for dismounting the pneumatic tire completely from the wheel and for taking the tire off the latter;

FIGURE 2 shows a perspective view of a modified device adapted for mounting a pneumatic tire upon a wheel rim in which the device serves at the same time as a holding means for said rim;

FIGURE 5 represents an upper plan view of the base of the device;

FIGURE 6 is an elevational view of the base according to FIGURE 5;

FIGURE 7 is a detail of the central stem;

FIGURE 8 represents in detail the lever mounted upon the central stem;

FIGURE 9 illustrates a device for the central fastening of a wheel upon the device;

FIGURES 10 to 12 show a rotary tool-holding member;

FIGURE 13 shows a special tool for the introduction of the bead of a pneumatic tire into the circular hollow of a rim;

FIGURES 14 and 15 show a holding member for wheels upon the device according to the invention;

FIGURES 16 and 17 show a second type of holding member for wheels of special design upon the device according to the invention.

With reference to the drawings, the device forming the subject matter of the invention comprises a base formed by a cross piece made of U-profile iron, indicated by the reference 1. At each of the ends of the arms of the cross piece 1 there are arranged individual small fins 1' projecting upwardly from one of the flanges of the U-profiles.

Figure 3:
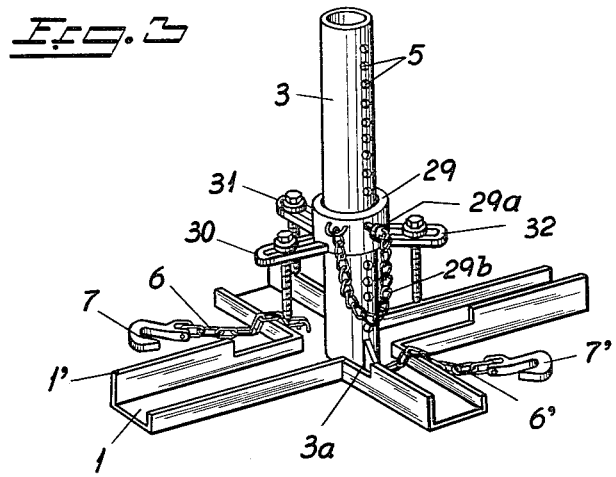
FIGURE 3 shows a device similar to FIG. 2 arranged with an accessory member for holding the wheel rims of automobiles of European manufacture.
Figure 4:
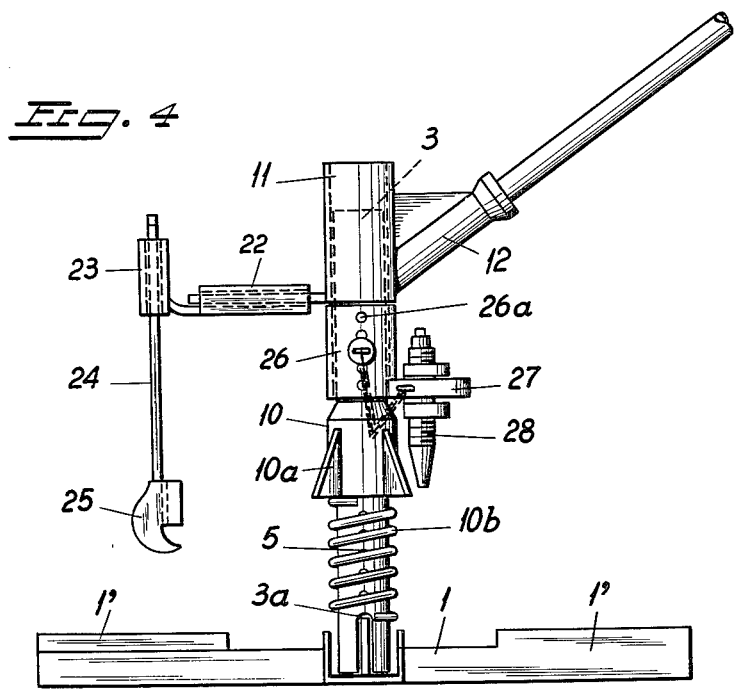
FIGURE 4 is an elevational view of the device according to the invention in the disposition corresponding to FIGURE 2.

To one of the fins 1' is secured by means of a chain 2, a bolt 2' serving to fasten a central mast or stem 3 projecting in upright position and perpendicularly to the center of the cross piece 1, as may be clearly seen particularly in FIGURES 1 to 3. The central stem 3 is cylindrical in shape and is formed with a row of holes 5 spaced at regular distances from each other and extending normal to the axis of stem 3 (see FIGURE 7). In order to secure the central mast or stem 3 in its position centrally of the cross piece, the latter is integral with a pipe stub 4. The cross piece carries at either side of the stem 3 the chains 6, 6', provided at free ends thereof with individual hooks 7, 7', intended for holding wheels of large diameters in place.

The device comprises a lever 9, illustrated in detail in FIGURE 8, which may be pivotally fastened to the central stem 3 and which serves for the following purposes: (a) to pry apart the beads of a tire to be dismounted from the wheel rim; (b) to remove the tire bead at one side of the tire off the rim, without cutting the reinforcing cord, by simply inserting the claw-shaped end 9a; (c) to remove from the wheel the tire bead at both sides at the same time, i.e. the entire curved portion. The lever 9 is pivoted to the mast or stem 3 either to the right or to the left, by a bolt inserted through one of the holes 9c formed in the flat portion 9b and through one of the holes 5 of the central mast or stem 3, the latter being fastened against rotation upon the cross piece by means of a slot 3a which in the position in which the stem 3 is mounted, registers with the hole 4a of the pipe stub 4 through which the bolt 2 passes to secure the pipe stub 4 to the stem 3. By means of the handle bar 9d the lever 9 may be swung in order to work upon the tire.

A centering sleeve 10 comprising a tubular portion provided with radial fins 10a is mounted about stem 3 freely slidable in axial direction and a coiled compression spring 10b (FIGURE 9) is placed about stem 3 between the crosspiece 1 and the centering sleeve 10 to normally hold the latter spaced from the cross piece.

A further complementary element of the device represented in FIGURES 10 to 12 is a tubular member 11 having a socket joint 12 projecting in an inclined position at an acute angle from said tubular member 11. The tubular member 11 is of adequate diameter to seat upon the stem 3 in a manner capable of both axial and rotary movement. The socket joint 12 serves for the insertion of a manipulating bar. A flat bar projects from the tubular member 11 normal to the geometrical axis of the latter and adapted to receive accessory working elements arranged at right angles to said flat bar, and from another face portion of the tubular member projects a pivoting fork 14 carrying, pivoted thereto by means of a pin 15, a flat socket joint 16. The end 17 of a lever 9 is supported in the socket joint 16, and lever 9 carries pivoted thereto a tool 18 adapted to push the bead 19 of the tire 20 into the hollow 21 of the rim, as clearly shown in FIGURE 1. A substantially L-shaped member may be mounted by means of a flat socket joint 22 on the flat bar 13 and the L-shaped member is provided with another flat socket joint 23 substantially normal to socket 22 and in which is shiftably mounted a further tool 24, as illustrated in FIGURE 13. The end of tool 24 is formed in the manner of a curved beak 25, for exerting pressure upon the portion surrounding the tire bead, while rotating jointly with the tubular member 11 for inserting the tire bead into the hollow of the rim.

In FIGURE 1, the manner of separating the pneumatic tire from the rim is shown. Before placing a new pneumatic tire upon a wheel, it will be obviously necessary to completely take off the tire which has been in place before and one side whereof has been unlocked from the rim as shown in FIGURE 1. For this purpose, the lever 9 (FIGURES 1a and 1b) is pivoted at one of the holes 9c provided in the flat portion thereof 9b to one of the holes 5 of the central mast or stem 3 with the aid of a pin, and with the end of the lever 9 having the shape of a narrow shovel 17 inserted between the locking edge or bead of the tire and the wheel rim, the bead of the tire is lifted by pushing the handle bar 9d of the lever downwardly to force the tire over the rim 21 to leave the tire completely free from said rim so as to leave the latter in proper condition for receiving a new tire.

There is provided a holding device for the wheels of usual type which are to be temporarily fastened in central position around the central mast or stem 3 and over the cross piece 1 and which is represented in FIGURES 14 and 15 showing an illustration in side elevation and plan view, respectively, of this device. The latter comprises a tubular piece 26 provided with lateral holes 26a and with a laterally projecting arm 27 extending normal to the axis of the piece 26. A tapering pin 28 is mounted by a screw arrangement in a longitudinal slot 27a formed in arm 27 to extend parallel to the axis of the tubular piece 26. The pin 28 has a prismatic head 28a, permitting, with the aid of a suitable tool, e.g. a spanner, to shift said pin 28 axially by screwing it downwardly. When the tubular member 26 is placed about the central stem 3, and fastened to the latter by means of a bolt inserted through one of the holes 26a and one of the holes 5 and when the pin 28 is radially shifted in the slot 27a of the arm 27, it is possible to align the pin 28 with one of the bolt holes of the wheel, and by the axial displacement of said pin 28 the conical lower end thereof may be inserted into one of the bolt holes of the wheel to secure the wheel on top of the cross piece 1 by the pressure of the pin 28 when the latter is screwed further downwardly unto said wheel, thereby enabling to carry out the operation of mounting or dismounting a tire as shown in FIG. 1a. Pin 28 forms therefore wheel rotation preventing means, preventing rotation of the secured wheel about the axis of stem 3. When the sleeve 26 with pin 28 thereon is used in combination with the spring biased centering sleeve 10, as shown in FIG. 1b, it is obvious that sleeve 26 and pin 28 can be adjusted in axial direction in such a manner that the wheel, while being prevented from rotation about the axis of stem 3, may yield downwards against the pressure of spring 10b when subjected to excessive downwardly directed forces so that damage of a tire during mounting the same on or during dismounting the same from the wheel is positively prevented.

FIGURES 16 and 17 show a further accessory member of the device for fastening the wheels if these be of special design, such as the wheels supplied with cars of European manufacture. This device comprises a tubular piece 29 apt to be placed over the central stem 3 and to be secured to the latter by a pin 29a connected to the end of a depending chain 29b. From this piece 29 three arms, 30, 31 and 32 project radially, the pieces 30 and 31 being spaced apart by an acute angle and the piece 32 being spaced from the pieces 30 and 31 being by obtuse angles one at each side, in a manner similar as the ends of a character "Y," seen in upper plan view. The arms 30, 31 and 32 carry each longitudinal slots 30a, 31a and 32a, respectively. In each of said slots are arranged the screws 30b, 31b and 32b, respectively, capable of being screwed down into threaded holes or slots provided with nuts in the arms of the cross piece 1. As the screws will locate themselves in such manner as to enter into holes made in the wheel to be fastened, and due to their capability of radial displacement, it is possible to effect the regular clamping of a wheel in central position with regard to the stem 3.

By means of this device all necessary operations required for mounting or taking off pneumatic tires with regard to wheels for automotive vehicles normally equipped with such tires, may be readily carried out, avoiding heavy work resulting from the stiffness of the tires, the occasional seizing of same in the rims due to incrustations caused by moisture or dirt and also due to the weight of many of such wheels.

Having now particularly ascertained and described the nature of the present invention and the manner in which the same may be carried into practice, it is hereby declared that what is claimed to be of exclusive invention and property, is:

1. In a tire changing apparatus, in combination, a support comprising a base and a column projecting upwardly substantially normal from the center of said base and being fixed thereto; a centering sleeve slidably mounted on said column and having radially extending supporting faces located along a cone surface, the apex of which is spaced further from said base than the base thereof, and being adapted to engage in the center opening of a wheel placed thereon to center the latter with respect to the axis of said column; spring means operatively connected to said centering sleeve and tending to move the latter away from said base; a clamping sleeve slidably mounted on said column above said centering sleeve and having an integral arm projecting radially therefrom substantially normal to the axis thereof; wheel rotation preventing means operatively connected to said arm adjustable in longitudinal direction of said arm and also in a direction substantially normal thereto, said wheel rotation preventing means having a lower frusto-conical free end adapted to engage into one of the bolt holes of the wheel from a side of the wheel opposite to the side engaged by said supporting faces; means for positively securing said clamping sleeve along said column against axial and axial and against rotational displacement; and means mounted on said column above said clamping sleeve for mounting a tire engaging tool thereon turnable about the axis of said column.

2. In a tire changing apparatus, in combination, a support comprising a base and a column projecting upwardly substantially normal from the center of said base and being fixed thereto; a centering sleeve slidably mounted on said column and having a plurality of tapered fins connected thereto uniformly distributed about its circumference and radially projecting therefrom, said fins having wheel supporting faces located along a cone surface, the apex of which is spaced further from said base than the base thereof, and being adapted to engage in the center opening of a wheel placed thereon to center the latter with respect to the axis of said column; a coil spring wound about said column and abutting with opposite ends thereof against said base and said centering sleeve, respectively, and tending to move the latter away from said base; a clamping sleeve slidably mounted on said column above said centering sleeve and having an integral arm projecting radially therefrom substantially normal to the axis thereof, said arm being formed with a longitudinal extending slot; screw means located in said slot and operatively connected to said arm adjustable in longitudinal direction of said slot and also in a direction substantially normal thereto, said screw means having having a lower frusto-conical free end adapted to engage into one of the bolt holes of the wheel from a side of the wheel opposite to the side engaged by said supporting faces; means for positively securing said clamping sleeve along said column against axial and against rotational displacement; a second sleeve mounted on said column above said clamping sleeve turnable about the axis of said column; a pair of arms radially extending from said second sleeve for mounting tire engaging tools thereon, at least one of said arms being mounted on said sleeve tiltable about an axis substantially normal to the axis of said column; and an elongated operating bar extending angularly displaced with respect to said arms radially away from said second sleeve.

References Cited in the file of this patent

UNITED STATES PATENTS

| | | |
|---|---|---|
| 1,716,882 | Freivogel | June 11, 1929 |
| 1,752,759 | Smith | Apr. 3, 1930 |
| 1,809,169 | Kennedy | June 9, 1931 |
| 2,178,101 | Hatch | Oct. 31, 1939 |
| 2,233,371 | Smith | Feb. 25, 1941 |
| 2,418,849 | Polt | Apr. 15, 1947 |
| 2,489,088 | Hewitt | Nov. 22, 1949 |
| 2,505,172 | Coats | Apr. 25, 1950 |
| 2,808,860 | Hildebrant | Oct. 8, 1957 |
| 2,845,969 | Duquesne | Aug. 5, 1958 |
| 2,912,047 | Douglas et al. | Nov. 10, 1959 |